United States Patent
Minelly et al.

(10) Patent No.: US 6,459,526 B1
(45) Date of Patent: Oct. 1, 2002

(54) L BAND AMPLIFIER WITH DISTRIBUTED FILTERING

(75) Inventors: John D. Minelly, Painted Post; Michael J. Yadlowsky, Corning, both of NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/370,735

(22) Filed: Aug. 9, 1999

(51) Int. Cl.[7] .................................................. H01S 3/00
(52) U.S. Cl. .................................................... 359/337.1
(58) Field of Search .................................. 359/134, 194, 359/290, 337, 339, 341, 342, 885; 385/126; 372/4

(56) References Cited

U.S. PATENT DOCUMENTS

| | | | |
|---|---|---|---|
| 4,725,141 A | | 2/1988 | Georgiou et al. ......... 350/96.15 |
| 4,737,002 A | | 4/1988 | Boucouvalas ............ 350/96.13 |
| 4,786,130 A | | 11/1988 | Georgiou et al. .......... 356/345 |
| 4,877,300 A | | 10/1989 | Newhouse et al. ...... 350/96.15 |
| 5,067,789 A | * | 11/1991 | Hall et al. .................. 385/27 |
| 5,087,108 A | | 2/1992 | Grasso et al. ............... 385/27 |
| 5,117,303 A | * | 5/1992 | Desurvire .................. 359/341 |
| 5,155,621 A | * | 10/1992 | Takeda et al. .............. 359/337 |
| 5,260,823 A | | 11/1993 | Payne et al. ................ 359/241 |
| 5,363,234 A | * | 11/1994 | Newhouse et al. ......... 359/337 |
| 5,434,702 A | | 7/1995 | Byron ........................ 359/341 |
| 5,469,292 A | * | 11/1995 | Bjarklev et al. ............ 359/341 |
| 5,557,442 A | * | 9/1996 | Huber ........................ 359/179 |
| 5,598,294 A | * | 1/1997 | Uno et al. ................... 359/341 |

(List continued on next page.)

FOREIGN PATENT DOCUMENTS

| | | | | |
|---|---|---|---|---|
| EP | 0212864 | | 7/1985 | ............ G02B/6/18 |
| EP | 0183449 | | 11/1985 | ............ G02B/6/28 |
| EP | 0204492 | | 5/1986 | ............ G02B/5/28 |
| EP | 0204493 | | 5/1986 | ............ G02B/6/28 |
| EP | 0211582 | | 7/1986 | ............ G02B/6/16 |
| EP | 0883218 | | 6/1998 | ............ H01S/3/06 |
| GB | 2340297 A | * | 2/2000 | |
| WO | WO 87/03676 | | 6/1987 | ............ G01D/5/26 |
| WO | WO 87/03701 | | 6/1987 | ............ G02B/6/26 |
| WO | WO 87/03702 | | 6/1987 | ............ G02B/6/28 |
| WO | WO0024094 | * | 4/2000 | .......... H01S/3/067 |
| WO | WO0049686 | * | 8/2000 | ............ H01S/3/06 |

OTHER PUBLICATIONS

J. Lee, U. Ryu, S.J. Ahn, N. Park, 'Enhancement of Power Conversion Efficiency for an L–band EDFA with a Secondary Pumping Effect in the Unpumped EDF Section', IEEE Photonics Technology Letters, vol. 11, No. 1, Jan. 1999, pp. 42–44.*

(List continued on next page.)

Primary Examiner—Thomas H. Tarcza
Assistant Examiner—Deandra M. Hughes
(74) Attorney, Agent, or Firm—Svetlana Z Short (57) ABSTRACT

An L-band optical amplifier has a rare earth doped gain medium including a filter distributed over a finite physical portion of the gain medium. The filter is distributed over between about 25% to substantially the entire length of the gain medium. The distributed filter substantially eliminates out-of-band light emission (C-band ASE, 1520 nm–1565 nm) and thus improves the performance of L-band amplification (1565 nm–1620 nm). Examples of distributed filters include discrete type filters such as long period gratings, or continuous type filters such as rare earth doped, twin core fibers, non-adiabatically tapered fibers and coaxial resonant ring fibers.

22 Claims, 4 Drawing Sheets

U.S. PATENT DOCUMENTS

| | | | | |
|---|---|---|---|---|
| 5,600,481 | A | * | 2/1997 | Nakabayashi .............. 359/341 |
| 5,710,659 | A | * | 1/1998 | Cline ........................ 359/341 |
| 5,740,292 | A | * | 4/1998 | Strasser ..................... 385/37 |
| 5,742,427 | A | * | 4/1998 | Kakui et al. ............... 359/341 |
| 5,838,487 | A | | 11/1998 | Nilsson et al. ............. 359/341 |
| 5,867,305 | A | * | 2/1999 | Waarts et al. .............. 359/341 |
| 5,872,650 | A | * | 2/1999 | Lee et al. ................... 359/341 |
| 5,920,424 | A | * | 7/1999 | Espindola et al. .......... 359/341 |
| 5,991,068 | A | * | 11/1999 | Massicott et al. .......... 359/337 |
| 6,043,930 | A | * | 3/2000 | Inagaki ...................... 359/341 |
| 6,049,417 | A | * | 4/2000 | Srivastava et al. ......... 359/341 |
| 6,104,527 | A | * | 8/2000 | Yang ......................... 359/341 |
| 6,124,959 | A | * | 9/2000 | Watanabe ................... 359/179 |
| 6,141,142 | A | * | 10/2000 | Espindola et al. .......... 359/341 |
| 6,144,486 | A | * | 11/2000 | Bennett et al. ............. 359/341 |
| 6,151,157 | A | * | 11/2000 | Ball et al. ................... 359/341 |
| 6,154,588 | A | * | 11/2000 | Kai ............................. 385/27 |

OTHER PUBLICATIONS

J.F. Massicott, R. Wyatt, B.J. Ainslie, Low Noise Operation of Er3+ Doped Silica Fibre Amplifier Around 1.6 $\mu$m Electronics Letters, Sep. 24, 1992, vol. 28, No. 20, pp. 1924–1925.*

J. Nilsson, S.Y. Yun, S.T. Hwang, J.M. Kim, S.J. Kim, 'Long–Wavelength Erbium–Doped Fiber Amplifier Gain Enhanced by ASE End–Reflectors', IEEE Photonics Technology Letters, vol. 10, No. 11, Nov. 1998, pp. 1551–1553.*

H. Ono, M. Yamada, Y. Ohishi, 'Gain–Flattened Er3+ Doped Fiber Amplifier for a WDM Signal in the 1.57–1.60 $\mu$m Wavelength Region', IEEE Photonics Technology Letters, vol. 9, No. 5, May 1997, pp. 596–598.*

H. Masuda, S. Kawai, K. Aida, 'Wideband erbium–dopd fibre amplifiers with three–stage amplification', Electronics Letters, vol. 34, No. 6, Mar. 19, 1998, pp. 567–568.*

Lee et al., Enhancement of Power Conversion Efficiency for an L–Band EDFA with a Secondary Pumping Effect in the Unpumped EDF Section, Jan. 1999, IEEE Photonics Technology Letters, vol. 11, No. 1, pp. 42–44.

Cordina et al., Ultra Low Noise Long Wavelength EDFA With 3.6dB External Noise Figure.

Espindola et al., Low noise, high gain, high conversion efficiency L–band EDFA, OAA, 1999, Nara Japan.

Sun Y Et Al. "An 80 nm Ultra Wide Band EDFA With Low Noise Figure and High Output Power" vol. 5, 1997, pp. 69–72, XP002074523.

Kakui et al., "Optical Amplification Characteristics around 1.58 $\mu$m of Silica–Based Erbium–Doped Fibers Containing Phosphorous/ Alumina as Codopants," OSA Trends in Optics and Photonics Series, vol. 25, 1998, pp. 68–71.

* cited by examiner

L BAND AMPLIFIER WITH DISTRIBUTED FILTERING

BACKGROUND OF THE INVENTION

1. Field of the Invention

The present invention relates generally to the field of optical communications and in particular to a device and method for providing optical signal amplification in the longer wavelength or tail region of a given gain spectrum.

2. Technical Background

Rare earth doped optical amplifiers and particularly erbium-doped fiber amplifiers (EDFAs) are used extensively and almost exclusively to amplify optical signals in today's communications systems and networks. The well-known benefits of rare earth doped optical amplifiers include cost effectiveness, good noise performance, a relatively broad polarization insensitive bandwidth, low insertion loss, and improved crosstalk performance over other amplifier technologies. EDFAs are increasingly being used in wavelength division multiplexed (WDM) optical communications systems and networks.

As service providers strive to keep up with the ever-growing demand for capacity, attention has been focused on providing as many WDM optical channels as possible within a given WDM system. As such, broadband optical amplifiers are being developed to realize dense WDM (DWDM) optical systems and networks.

Figure 2:
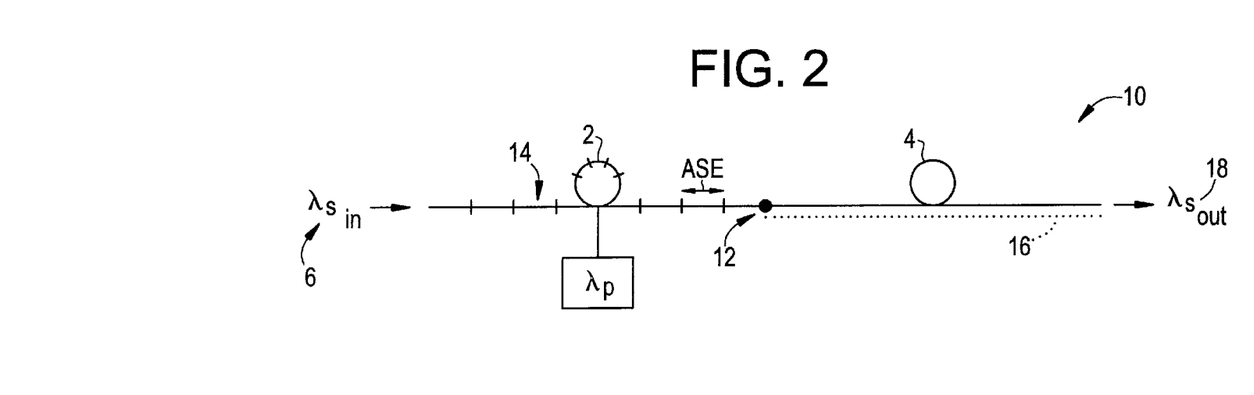
FIG. 2 is schematic representation of a two stage L-Band optical amplifier with distributed filtering in the first stage according to an embodiment of the invention.

The total gain spectrum for an EDFA is very wide, as shown in FIG. 2. The usable gain spectrum extends from around 1525 nm to 1565 nm and this is conventionally referred to as the erbium C-band. With appropriate gain equalization, an approximately 40 nm bandwidth is provided for DWDM applications. FIG. 2 also shows that the gain for an EDFA drops sharply in the spectral region below 1525 nm and the spectral region above 1565 nm. Although conventional gain equalization techniques cannot be practically implemented to further increase the gain bandwidth of EDFAs, the demand for higher capacity lightwave systems has renewed the interest in signal amplification in the longer wavelength range between about 1565 nm and 1620 nm, commonly referred to as the L-band or extended band. See, for example, Massicott et al., "Low noise operation of $ER^{3+}$ doped silica fiber amplifier around 1.6 micron," Elec. Lett., Volume 26, Number 20, pp 1645–1646, September 1990. In spite of the appreciation of the potential use of the long wavelength tail of the erbium gain window for optical signal amplification, little attention is evidenced in the public literature to the optimization of L-band amplifiers.

The performance of an L-band amplifier is limited by at least three inter-related factors. These include a) a reduced gain coefficient in the band of interest, b) self-saturation by short wavelength amplified spontaneous emission (ASE), and c) background loss in the long fiber coils necessary for high gain operation. The intrinsic reduction in gain/loss ratio for an L-band amplifier over a C-band amplifier results in reduced power conversion efficiency. This is further exaggerated by the reduction in average inversion which accompanies self-saturation and which reduces the already low gain coefficient even further, resulting in even more length dependent efficiency reduction. Furthermore, if the first stage of a multistage amplifier is operated at low inversion, the noise performance of the amplifier is significantly compromised. However, operation at high inversion produces C-band ASE which will reduce the power conversion efficiency of the amplifier.

Accordingly, the inventors have recognized a need to improve the performance of an L-band amplifier and more specifically have targeted the tradeoff between noise figure and power conversion efficiency to address this.

SUMMARY OF THE INVENTION

An embodiment of the present invention is directed to an optical amplifier for amplifying optical signals in a longer wavelength, tail region of a gain spectrum associated with the amplifier, including a rare earth-doped gain medium referred to as a gain stage of the amplifier; a source of pump power connected to the gain medium; and a filter distributed over the gain stage, wherein the filter attenuates light associated with amplified spontaneous emission (ASE) in the amplifier, such that substantially only the optical signals in the longer wavelength region of the gain spectrum are amplified.

Another embodiment of the invention is directed to an optical amplifier for amplifying optical signals in a longer wavelength, tail region of a gain spectrum associated with the amplifier and includes a first rare earth-doped gain medium referred to as a first gain stage of the amplifier, wherein a filter is distributed over the first gain medium. The filter provides an attenuation of light associated with amplified spontaneous emission. The amplifier further includes a second rare earth-doped gain medium referred to as a second gain stage of the amplifier connected to the first gain stage; and a source of pump power connected to the amplifier for stimulating the rare earth-doped gain media. In an aspect of this embodiment, the second gain stage is preferably serially connected to the first gain stage closer to an output location of the first gain stage than to an input location in terms of signal propagation direction. In another aspect of this embodiment, a filter is also distributed over the second gain stage of the amplifier to further reduce ASE generated by the amplifier. In another aspect of this embodiment the pump source is preferably coupled to the first gain stage at a location closer to an input of the first gain stage than to an output of the first gain stage.

In a continuous distributed filtering aspect of both embodiments described above, the distributed filter is a rare earth doped, multiple and preferably dual core fiber making up the first gain stage. One of the cores is pumped to provide gain for the useful gain spectrum and the other core is unpumped causing it to absorb the out-of-band (ASE) light.

In another continuous distributed filtering aspect, the distributed filter is a non-adiabatically tapered fiber making up the first gain stage in which mode coupling occurs in the taper region to provide the filtering effect.

In a further continuous distributed filtering aspect, the distributed filter is a rare earth doped fiber making up the first gain stage and having a doped axial core and a doped or undoped coaxial annular core wherein bend loss provides the filtering effect over the length of the fiber.

In an alternative discrete filtering aspect, the distributed filter is a series of discrete filters such as long period gratings that are written or spliced into the rare earth doped fiber making up the first gain stage. In this aspect, it may be desirable to provide a doped fiber glass host different from a typical (germano)-alumino-silicate host glass, such as a phospho-silicate glass, that provides a more efficient medium for writing gratings therein.

The invention described herein particularly provides a device and a method for amplifying light signals in the erbium L-band having improved performance over L-band amplifiers without distributed filtering. Distributed filtering according to the invention substantially eliminates the out-of-band ASE generated in the amplifier due particularly to hard pumping, which in turn allows the amplifier to operate at a higher average inversion without self-saturation by the C-band ASE. Higher average inversion operation allows for a shorter active coil length for obtaining target gain values and in addition contributes to improved power conversion efficiency due to a reduction in background loss. Amplifier noise figure is also improved by the ability to achieve the target L-band stage gain at a higher inversion. The invention thus also provides benefits for amplifier circuit layout and packaging considerations.

Although the device according to the invention is illustratively described as a fiber optical amplifier, it is not so limited as a planar architecture, for example, can also implement the invention.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate embodiments of the invention, and together with the description serve to explain the principles and operation of the invention.

DETAILED DESCRIPTION OF A PREFERRED EMBODIMENT

To provide the reader with a clearer understanding of the invention, the term "distributed filter" as used herein refers to filtering that occurs over some finite physical portion of the filtered gain stage (i.e., the active fiber), as opposed to at merely a single or discrete location in the gain stage. Thus the filter may, for example, be distributed over a length of the gain stage practically ranging from about 25% of the fiber to substantially the entire gain stage depending upon how well the distributed filter provides filtering of the ASE produced by the amplifier. This will be described in greater detail below in relation to the amplifier filtering embodiments of the invention; however, it can be said that the distributed filter may include a plurality of discrete filters distributed over the physical portion of the gain medium to provide effective filtering or, alternatively, a physically continuous filter distributed over a portion of the gain medium.

A helpful distinction is also attempted for the reader between a single stage amplifier and a multi-stage amplifier as those terms are herein used. A single stage amplifier refers to a single section of gain medium pumped by a source of pump light. A multi-stage amplifier refers to at least two sections of gain media that are physically separated or connected via a discrete component, and in which each section provides more than nominal gain to a signal. Therefore, as these terms are herein used, a single gain stage can include a series of discrete filters along its length and remain a single stage. We believe that this will be clearly understood by a person skilled in the art. Accordingly, the amplifier shown in FIG. 2 is a multi-stage amplifier having a first stage 2 (with discrete distributed filters 14 in an exemplary embodiment of the invention) and a second stage 4 connected at component 12.

It will also be appreciated by those persons skilled in the art that a multi-stage rare earth-doped L-band optical amplifier may provide advantages over a single stage amplifier in terms of design, control, and management of system architecture and performance. For example, gain equalization, dispersion compensation, wavelength routing, and other functions are conveniently performed between optical amplifier stages. Accordingly, for illustrative purposes, the invention will be described in detail with reference to a multi-stage amplifier; however this in no way limits the invention nor precludes an amplifier that embodies the invention from being a single stage L-band amplifier.

Reference will now be made in detail to the present preferred embodiments of the invention, examples of which are illustrated in the accompanying drawings. Wherever possible, the same reference numbers will be used throughout the drawings to refer to the same or like parts.

Figure 1:
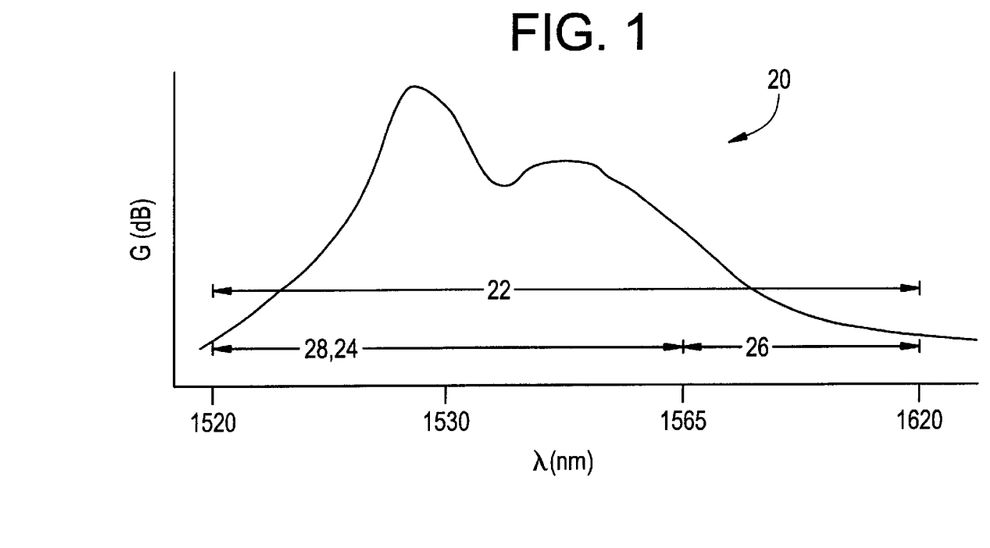
FIG. 1 is a graphical representation of gain versus wavelength over the C-band and the L-band for an erbium doped optical amplifier.

FIG. 1 shows a representative gain spectrum 20 for a conventional (germano)-alumino-silicate erbium doped fiber covering the spectral region from approximately 1520 nm to 1620 nm. This spectral region is hereinafter referred to as the known gain bandwidth 22. A spectral region that is typically referred to as the C-band wavelength range for a EDFA is shown as, and is hereinafter referred to as, the first gain spectrum 24. It occupies the shorter wavelength region of the known gain bandwidth 22 extending approximately from 1520 nm to 1560 nm. According to an embodiment of the invention, the first gain spectrum 24 is primarily associated with a first gain stage 2 of amplifier 10 of FIG. 1. The wavelength region generally referred to as the L-band (or extended band) of an EDFA occupies the longer wavelength (tail) region of the known gain bandwidth 22 and extends from about 1560 nm to 1620 nm. It is hereinafter referred to as the useful gain spectrum 26 and is the emission spectrum primarily associated with a second gain stage 4 of amplifier 10. In operation, an optical amplifier emits a broad based noise spectrum known as amplified spontaneous emission (ASE) in both the forward and backward directions when the gain medium of the amplifier is pumped. The ASE will hereinafter be referred to as the out-of-band light emission 28 and, with respect to the instant invention, occupies a spectral region that is substantially coincident with the first gain spectrum 22. The attributes of ASE in rare earth doped optical amplifiers are believed to be well understood by those persons skilled in the art and require no further discussion for an understanding of the invention.

FIG. 2 illustrates an exemplary embodiment of an amplified spontaneous emission (ASE) managed L-band erbium doped fiber amplifier (EDFA) 10 according to the invention. A first stage erbium doped fiber gain medium 2 is serially coupled to a second stage erbium doped fiber gain medium 4 at coupling point 12. Although both stages 2, 4 of the L-band EDFA are shown coupled immediately adjacent to one another, it will be appreciated by those skilled in the art that various components such as optical isolators, filters, or other signal management components may be inserted between the two stages. A source of pump power 8 is appropriately coupled to the amplifier, preferably to the first stage at or near an input location thereof to provide pumping energy in a forward (i.e., co-directional with the signal) direction. It is believed that this pumping architecture gives amplifier operation with a lowered noise figure and increased power conversion efficiency. This is typically accomplished by relatively hard pumping at the input of the first stage of the amplifier where a high inversion occurs. However, as further appreciated by those skilled in the art, different pumping schemes are possible; for example, either or both stages of the EDFA may be forward and/or backward pumped, typically in the 980 nm pump band and/or the 1480 nm pump band, or other pump bands depending upon the amplifier design and architecture, performance requirements, gain stage compositions, and other considerations. An input optical signal $\lambda_{in}$, 6, lying within the useful gain spectrum 26 of FIG. 1 is input to the amplifier 10 at an input end of the first gain stage 2 (as shown traveling from the left to the right in FIG. 2) and exits an output of the second gain stage 4 as amplified signal $\lambda_{out}$, 18. A filter 14 is distributed along the first gain stage 2 to provide filtering of the ASE 28 as shown in FIG. 1, as will be described in greater detail below. Optionally, a filter 16 is distributed along the second gain stage 4 to further reduce ASE in the second gain stage.

The invention addresses at least three factors that limit the performance of an L-band amplifier. The first is a reduced gain coefficient in the L-band compared to the C-band gain at particular amplifier inversion values as illustrated by gain curve 20 in FIG. 1 over the useful gain spectrum 26. The second factor is self-saturation by broadband ASE generated in the first gain stage 2 which depletes the upper energy level population and reduces the average inversion of the amplifier, thus reducing signal gain. The third factor relates to background loss in the long lengths of active fiber that are typical for high gain operation in the L-band. The intrinsic reduction in the gain to loss ratio for an L-band amplifier over a C-band amplifier results in reduced power conversion efficiency. Moreover, when the first stage 2 of the EDFA 10 is operated at a low average inversion value, the noise figure (NF), a primary figure of merit for optical amplifier performance, is significantly compromised, as shown by the curves 1–7 in FIG. 6, respectively, for increasing inversion values. However, when the first stage 2 is pumped relatively hard so as to provide a high average inversion value in the first stage 2, the ASE 28 emitted in the C-band (i.e., the out-of-band light emission), will significantly compromise the power conversion efficiency of the amplifier. To address these issues, a preferred amplifier embodiment of the invention as shown in FIG. 2 includes a filter 14 distributed over the first gain stage 2. The effective characteristics of filter 14 are its bandwidth and depth. Filter bandwidth is conventionally defined as the spectral region over which filtering is provided to a certain degree; while filter depth is defined herein as the magnitude of the filtering over a particular bandwidth. Preferably the filter 14 will have a depth that is approximately equal to or greater than a peak gain coefficient of the know gain bandwidth 22, typically occurring at or near 1530 nm.

Figure 9:
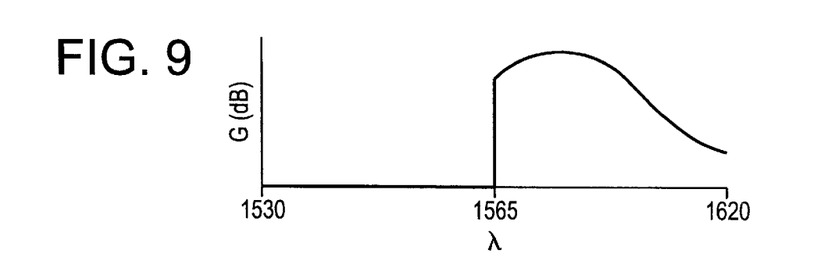
FIG. 9 is a graphical representation of a representative L-band gain profile provided by a distributed filter amplifier according to the invention.

According to an embodiment of the invention, the filter 14 exhibits a bandwidth and depth sufficient to attenuate and, preferably, to effectively eliminate most, if not all, of the out-of-band light emission 28, which in turn allows the amplifier of the invention to operate at a relatively higher average inversion without self-saturation by the C-band ASE. This in turn leads to the ability to use a shorter active coil length for a particular target gain, also reducing background loss and improving the power conversion efficiency of the amplifier which is already improved by the C-band ASE suppression. In addition, the noise figure of the amplifier is improved by the ability to achieve the target L-band stage gain (second gain stage 4 ) at a higher average inversion value. Distributed filtering according to the invention thus provides a peak gain in the useful gain spectrum 26 of FIG. 1 that is also the peak gain over the known gain bandwidth 22. FIG. 9 shows a representative gain profile 90 for the distributed filter L-band amplifier of the invention. Such a gain profile may still require gain flattening or gain equalization. The distributed filter 14 in the first gain stage 2 of FIG. 2 is intended to eliminate C-band emission from about 1520 nm to 1565 nm and allow the amplifier to provide L-band gain from about 1565 nm to 1620 nm.

In an alternative embodiment of the invention, a filter 16 is additionally distributed over the second gain stage 4 as illustrated by the dashed line in FIG. 2. Distributed filtering over the second gain stage 4 reduces local inversion variance due to the concentrated pumping at the second stage input from first stage remnant pump power, reduces competition between backward ASE and forward traveling signals, and further contributes to increasing the power conversion efficiency of the amplifier.

According to alternate aspects of the invention, the filter 14 (and optional filter 16) may take the form of a continuous filter extending over a finite physical portion of the first gain stage, ranging from about 25% of the length to substantially the entire length; or the filter may constitute a number of discrete filters that extend likewise over the gain stage. As will be appreciated, the distributed filtering according to the invention is intended to attenuate and, preferably eliminate, a broadband spectrum of light coincident with the erbium C-band. The ability of the filter to achieve this will determine the extent of its distribution over the gain stage.

Figure 7A:
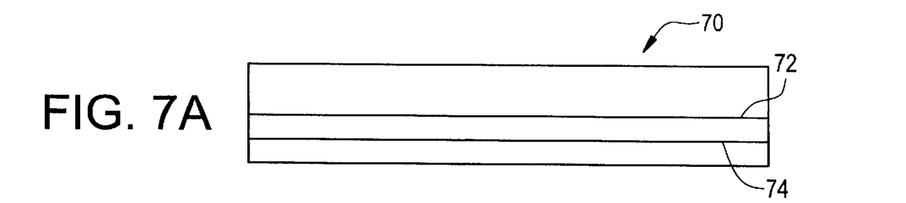
FIGS. 7(a) and 7(b) are schematics diagram of a dual core distributed filter according to an embodiment of the invention.
Figure 7B:
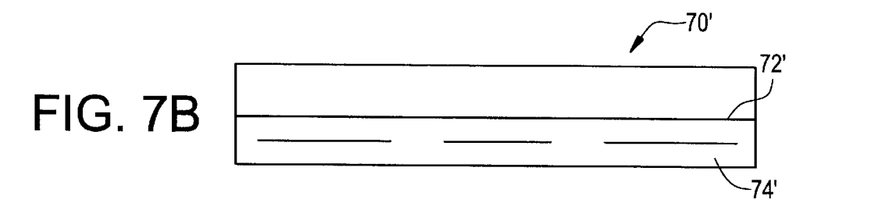

In a preferred embodiment of the invention, the filter 14 is a continuously distributed filter having appropriate depth and bandwidth to substantially eliminate the out-of-band light emission generated in the first gain stage. One example of such a continuous filter is shown schematically in FIG. 7(*a*) as a fiber 70 having two erbium doped cores 72, 74, one of which (72) is optically pumped to provide gain for the L-band signals and the other of which (74) is unpumped to absorb the out-of-band light and thus provide the loss for the C-band ASE that couples over to the unpumped core (74). This fiber performs the desired function if the waveguide dispersion of the two cores is such that coupling occurs only for C-band wavelengths. In such an embodiment the doping concentration of the unpumped core (74) may be much higher than that of the amplifying core (72) to enhance the filtering characteristics. It may even be deliberately clustered to prevent absorption saturation. Two aspects of this embodiment include a continuous unpumped core 74 as shown in FIG. 7(*a*), and a segmented unpumped core 74' as shown in FIG. 7(*b*). Fibers of these types are generally known in the art and require no further description for the purpose of understanding the invention described herein. See, e.g., U.S. Pat. Nos. 5,087,108 and 5,218,665, the disclosures of which are herein incorporated by reference.

Figure 10A:
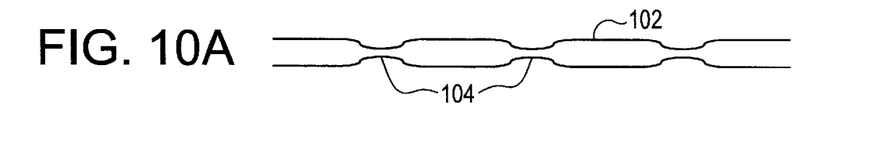
FIG. 10(a) is a schematic representation of a non-adiabatically tapered fiber distributed filter for an embodiment of the invention.
Figure 10B:
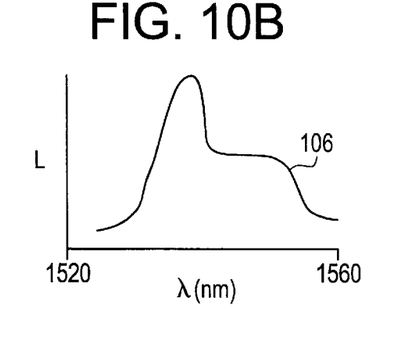
FIG. 10(b) is a schematic representation of loss versus wavelength provided by the filter of FIG. 10(a)

Another aspect of the distributed filter amplifier according to the invention relies on the gain fiber having a non-adiabatic taper; that is, a fiber taper construction which induces mode coupling between the $LP_{01}$ and $LP_{02}$ modes. Such a distributed filter gain fiber is shown schematically in FIG. 10(*a*) where the fiber 102 includes a series of non-adiabatic tapers 104. FIG. 10(*b*) shows a representative loss spectrum profile 106 for the non-adiabatic fiber taper filter 102. The loss spectrum essentially mimics the gain curve of an erbium doped fiber at a particular inversion value. The use of such a filter in the amplifier according to the invention ideally produces an L-band gain as representatively shown in FIG. 9. Non-adiabatic taper based fibers are preferably constructed from fibers with a secondary co-axial annular core or a depressed cladding which improve the ease of manufacture. See, e.g., U.S. Pat. No. 4,877,300, which is incorporated herein by reference as though fully set forth in its entirety, for a more detailed explanation of construction of non-adiabatic taper based fibers.

Figure 11:
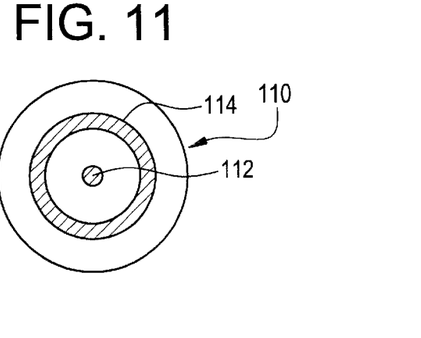
FIG. 11 is a schematical cross sectional view of an annular/co-axial core filter for an embodiment of the invention.

In another embodiment illustrated in part by FIG. 11, a hybrid distributed filter L-band amplifier combines the mechanisms of coaxial coupling with dual core coupling and includes a gain fiber 110 having a conventional axial doped core 112 and a coaxial annular core 114 that can be doped or undoped depending upon design and performance considerations. In distinction to the non-adiabatic fiber taper filtered amplifier embodiment described above in which coupling only occurs where the fiber is tapered, in the instant embodiment power is continuously exchanged between the inner and outer cores 112, 114, respectively. Experimental results indicate that such fibers do not exhibit the expected sinusoidal length dependence to the transverse power distribution associated with mode beating. Rather the loss of the designed coupling bandwidth increases monotonically with fiber length. It is believed that this due to an increased bend sensitivity of the ring waveguide 114 with respect to the axial core waveguide 112. Hence the device will operate similar to the doped dual core fiber except that the lossy core 114 relies on microbend or macrobend induced leakage rather than absorption.

Figure 8:
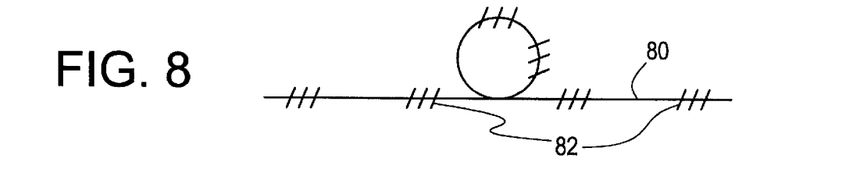
FIG. 8 is a schematic diagram of a discrete distributed filter amplifier embodiment according to the invention.

An example of a discrete type distributed filter for an amplifier embodiment according to the invention is shown schematically in FIG. 8 and comprises an active fiber 80 having a plurality of long period gratings (LPGs) 82 written over some finite physical length of the fiber. Long period gratings, as used herein, include fiber gratings having a period which causes light of a given wavelength to couple into the cladding of the fiber and radiate out. Due to the fact that conventional alumino-silcate erbium doped fibers are only weakly photosensitive, it may be desirable to splice the LPGs into the amplifier fiber. However, since this may add excess loss and production costs, it may be more desirable to use a modified gain fiber composition and/or fiber structure to effectively write the LPGs in the gain fiber. For example, a phospho-silcate host having gratings written with a 193 nm writing wavelength would address the aforementioned difficulties. Long period gratings and their production in fibers is well known in the art and requires no further discussion for an understanding of the invention.

In the discrete distributed filter aspect of the amplifier invention, a preferable inter-filter spacing in a single stage of the amplifier would be less than or equal to about a 20 dB gain length at a peak gain wavelength of the amplifier. In this aspect of the invention at least some of the filters may have filter bandwidths that overlap. Furthermore, at least some of the filters will have a filter bandwidth that substantially extends to cover the out-of-band light emission 28.

Presented below in conjunction with FIGS. 3–6 are the results of modeling the effect of distributed filtering on L-band amplifier performance for a typical (germano)-alumino-silicate erbium doped fiber. The amplifier pump power was 140 mW at 980 nm, and 40 signal channels of −21 dBm input power were lumped, for simplicity, at 1590 nm.

Figure 3:
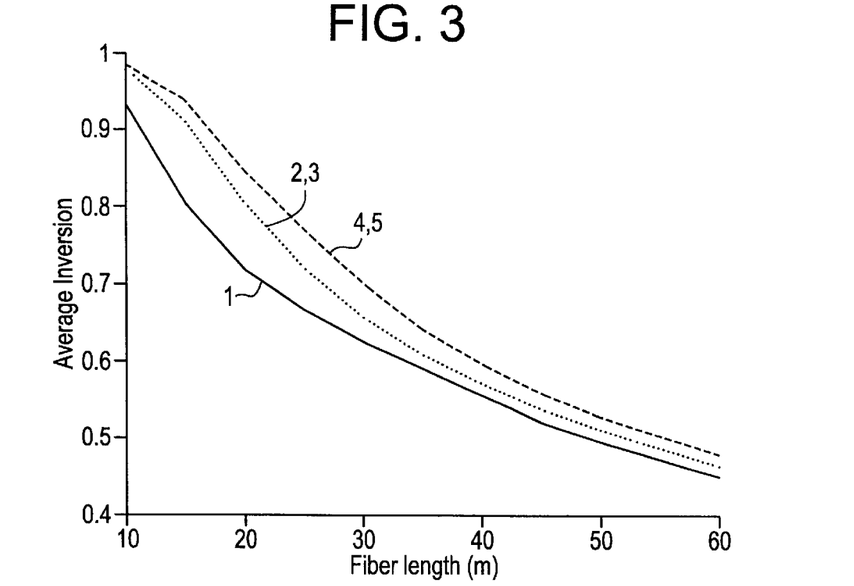
FIG. 3 is a graphical representation of average inversion values versus active fiber length for various filter bandwidths and filter depths according to an embodiment of the invention.

FIG. 3 shows plots of average inversion versus first stage active fiber length for the amplifier. The plot labeled 1 is the result for no (distributed) filtering. Plots 2 and 3 result from a constant filter bandwidth from 1525 nm to 1545nm with the difference being a filter depth of 5 dB/m for plot 2 and a filter depth of 20 dB/m for plot 3. Plots 4 and 5 result from a filter bandwidth of 1525 nm to 1560 nm with plot 4 representing a filter depth of 5 dB/m and plot 5 representing a filter depth of 20 dB/m. Comparing plots 4 and 5 with plots 2 and 3 of FIG. 3 indicates that increasing the filter bandwidth in the C-band reduces inversion reduction due to ASE self-saturation. However, increasing the filter depth much above the peak gain coefficient (i.e., the maximum gain at 1530 nm at full inversion) has a negligible affect. It is thus evident that the target gain for the 1590 nm signal can be achieved in a shorter length of fiber operating at a relatively higher average inversion. This provides additional benefits for improved packaging and amplifier layout.

Figure 4:
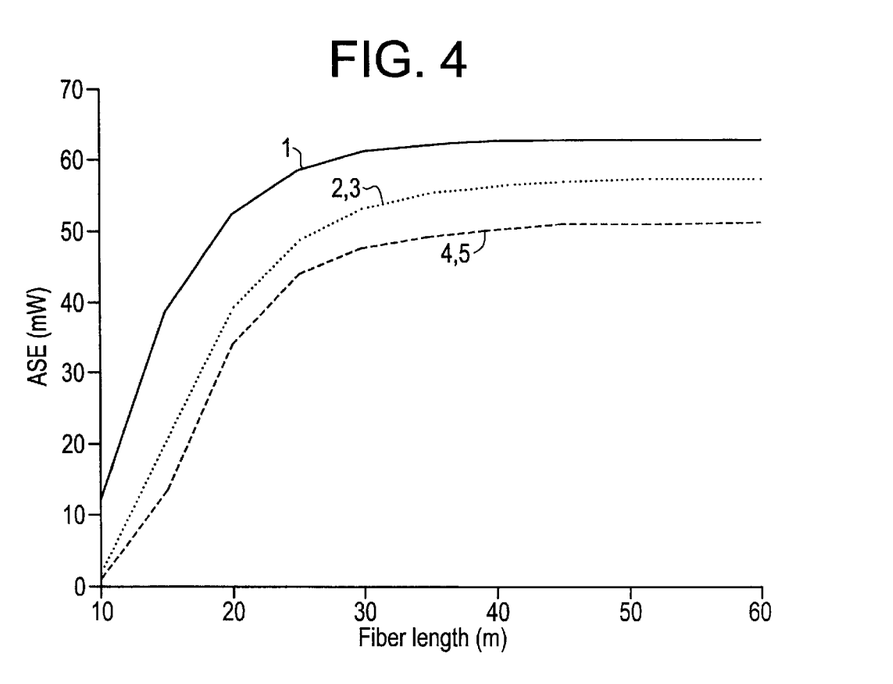
FIG. 4 is a graphical representation of backward ASE power versus active fiber length for various filter bandwidths and filter depths according to an embodiment of the invention.
Figure 5:
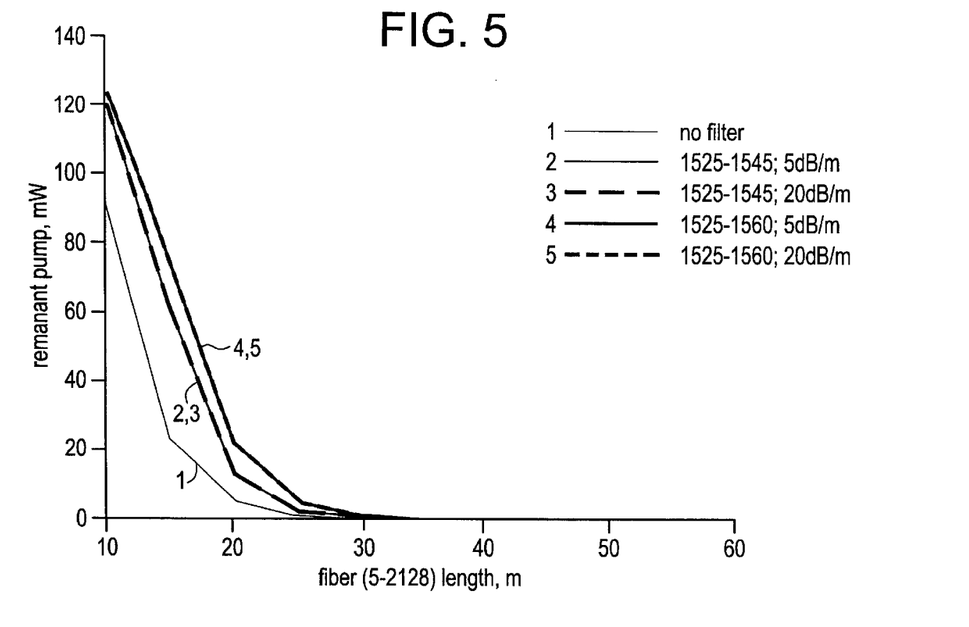
FIG. 5 is a graphical representation of remnant pump power versus active fiber lengths for various filter bandwidth values and filter depths according to an embodiment of the invention.

FIG. 4 shows plots of backward traveling ASE versus first gain stage fiber length where plots 1–5 have the same filter bandwidth and filter depth characteristics as plots 1–5, respectively, in FIG. 3. Comparison of plots 2 and 3 with plots 4 and 5 indicate that the filter depth, once the threshold filter depth has been reached, has little effect on backward ASE; however, progressive reduction in the back traveling ASE results from increasing the filter bandwidth.

The benefit of the reduction in ASE described above is accompanied by an increase in the remnant pump power which confirms the anticipated improvement in power conversion efficiency obtained with distributed filtering according to the invention. This is indicated with reference to FIG. 5 which is a plot of remnant pump power in milliwatts versus first gain stage fiber length. The plots labeled 1–5 have identical filter bandwidth and filter depth characteristics as those associated with plots 1–5 of FIG. 3. As shown, filter depth is an inferior control compared to filter bandwidth which can be observed by comparing plots 2 and 3 with plots 4 and 5. More importantly, distributed filtering with the appropriate filter depth and bandwidth shortens the necessary fiber length and increases the amount of remnant pump in the first stage for pumping the second stage, thus improving the power conversion efficiency of the amplifier.

Figure 6:
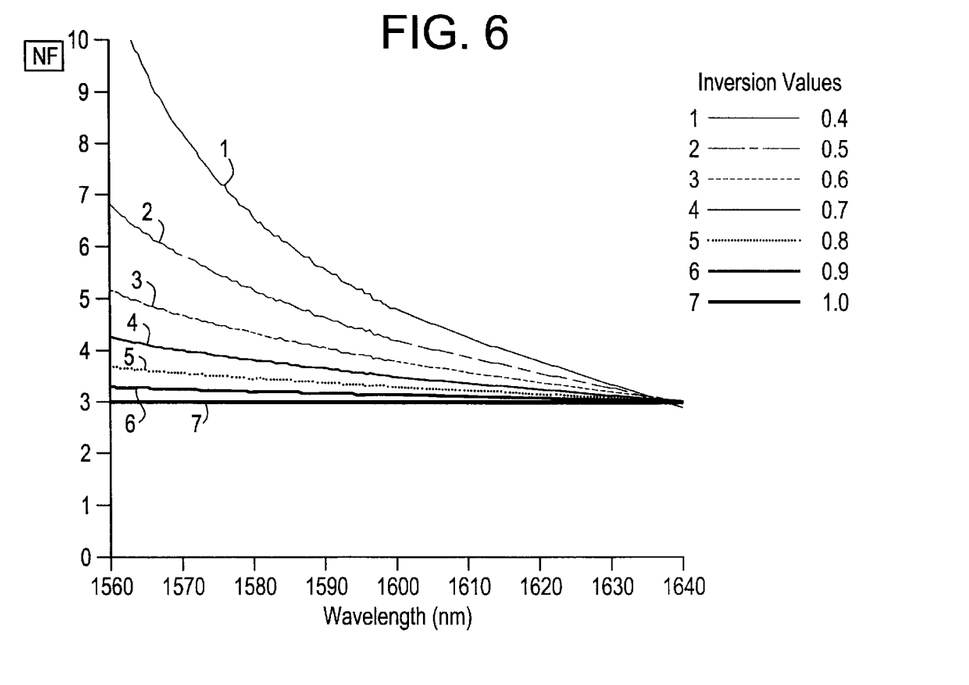
FIG. 6 is a graphical representation of amplifier noise figure versus wavelength in the erbium L-band for various average inversion values according to an embodiment of the invention.

In addition to the improved power conversion efficiency obtained with the instant invention, noise figure improvement is also achieved as shown by plots 1–7 in FIG. 6. FIG. 6 is a graph of noise figure versus signal wavelength for average inversion values ranging from 0.4 to 1.0 as shown by plots 1-7 respectively. Therefore the higher average inversion obtainable by distributed filtering according to the invention results in lower noise figure values.

Based upon the information provided in FIGS. 3–6, for an exemplary amplifier having a typical first stage target gain of 10 dB, distributed filtering from 1525 nm to 1560 nm according to the invention would enable a reduction in length of the first gain stage active fiber from 30 meters (without a filter) to approximately 20 meters. Moreover, 20 mW of pump power would be saved and the average inversion would be increased from 0.6 to 0.85. This increase in the average inversion value would significantly improve the noise figure of the amplifier especially at wavelengths on the shorter side of the L-band where sensitivity to inversion is highest.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. An optical amplifier for optical fiber telecommunications lines operating with an in-band transmission signal in a longer wavelength, tail region of a gain spectrum associated with the amplifier, said longer wavelength, tail region being between 1570 nm and 1620 nm, said amplifier comprising:

a rare earth doped gain medium providing a first gain stage for the amplifier;

a source of pump power connected to the gain stage; and a filter distributed over the gain medium wherein the filter attenuates light associated with amplified spontaneous emission (ASE) in the amplifier, such that the transmission signal in the longer wavelength region of the gain spectrum is amplified wherein the filter includes a continuous filter and the continuous filter comprises a doped waveguiding core that is unpumped so as to absorb the ASE light, and a doped waveguiding core that is pumped so as to amplify the transmission signal, further wherein the unpumped waveguiding core and the pumped waveguiding core exhibit waveguide dispersions such that coupling from the pumped core to the unpumped core occurs substantially only for light in the ASE gain spectrum.

2. The amplifier of claim 1 wherein the rare earth dopant includes erbium, further wherein the gain spectrum associated with the amplifier extends from about 1520–1620 nm, the ASE extends from about 1520–1565 nm, and the longer wavelength, tail region of gain spectrum is between 1570 nm and 1620 nm.

3. The amplifier of claim 1 wherein the filter is distributed over a finite physical portion of the gain medium ranging from between about 25% thereof to substantially the entire gain medium.

4. The amplifier of claim 3 wherein the filter includes a plurality of discrete filters.

5. The amplifier of claim 4 wherein the discrete filters have an inter-filter spacing corresponding to less than or equal to about a 20 dB gain length at a peak gain wavelength of the gain spectrum of the amplifier.

6. The amplifier of claim 4 wherein the discrete filters are long period gratings.

7. The amplifier of claim 4 wherein the long period gratings are written into the gain medium.

8. The amplifier of claim 1 wherein the continuous filter comprises an axial doped waveguiding core and one of a doped and an undoped annular waveguiding core that is coaxial with the axial core.

9. The amplifier of claim 1 wherein the filter has a bandwidth that is substantially coincident with the spectral bandwidth of the ASE, and a depth that is approximately equal to, or greater than, a peak gain coefficient in the gain spectrum of the amplifier.

10. The amplifier of claim 1, further comprising another gain medium providing another gain stage coupled to the first gain stage.

11. The amplifier of claim 10, wherein the other gain stage is coupled closer to an output of the first gain stage than to an input thereof.

12. The amplifier of claim 10 further wherein an ASE filter is distributed over the other gain medium.

13. The amplifier of claim 1, wherein the first and second gain stages each comprises a rare earth doped fiber gain medium.

14. The amplifier of claim 1 wherein the rare earth doped fibers have different host glass compositions.

15. The amplifier of claim 8 wherein at least one of the rare earth doped fibers comprises a phosphor-silicate host glass composition.

16. An erbium doped fiber amplifier having a known gain bandwidth for providing a signal amplification in a long wavelength region of the known gain bandwidth said long wavelength region being between 1570 and 1620 nm, said amplifier comprising:

first gain stage comprising an erbium fiber exhibiting a first gain spectrum within the known gain bandwidth extending from about 1520 nm to 1565 nm;

a source of pump energy coupled to the first gain stage;

a second gain stage comprising an erbium fiber serially connected to the first gain stage exhibiting a useful gain spectrum within the known gain bandwidth between 1570 nm and 1620 nm, wherein the first gain stage further comprises a filter distributed along the first gain stage, said filter having a depth and a bandwidth sufficient to filter an out-of-band light emission having an emission spectrum substantially coincident with the first gain spectrum to the extent that any unfiltered out-of-band light emission in the first gain stage is insufficient to self-saturate the first gain stage, further wherein the useful gain spectrum exhibits a peak gain that is the peak gain of the known gain bandwidth wherein the filter comprises two erbium doped waveguiding cores in the erbium doped fiber of the first gain stage, further wherein no pumping energy is delivered to one of the doped cores such that said unpumped core attenuates the out-of-band light emission coupled into said unpumped core.

17. The amplifier of claim 16 wherein the first gain spectrum is substantially constant and has a neutral gain magnitude, and the useful gain spectrum includes a peak gain of the known gain bandwidth.

18. A method of operating an optical amplifier for amplification of a signal in a longer wavelength tail region of a known gain bandwidth of the amplifier, said longer wavelength tail region being between 1570 nm and 1620 nm, said method comprising the steps of:

distributing a filter over a finite physical length portion of a phosphor-silicate based gain medium of a first gain stage of the amplifier wherein the filter has a depth and bandwidth sufficient to attenuate a wavelength spectrum associated with amplified spontaneous emission from the amplifier, wherein the step of distributing a filter over the medium of the amplifier comprises distributing continuous filter over the gain medium.

19. A method of operating an optical amplifier for amplification of a signal in a longer wavelength tail region of a known gain bandwidth of the amplifier, amplifier, said longer wavelength tail region being between 1570 nm and 1620 nm, said method comprising the steps of:

distributing a filter over a gain stage of the amplifier said gain stage containing phosphor-silicate based fiber to attenuate an out-of-band light emission associated with amplified spontaneous emission from the amplifier such that an average inversion value associated with the amplifier is higher than the average inversion value associated with the amplifier without a distributed filter.

20. The method of claim 19 wherein the filter is distributed over an input gain stage of the amplifier.

21. The method of claim 20 wherein the filter is distributed over a second gain stage of the amplifier coupled to the first gain stage.

22. The method of claim 19 wherein he amplifier is an erbium doped optical amplifier, the known gain bandwidth is from about 1520 nm–1620 nm, and the out-of-band light emission is from about 1620–1565 nm.

* * * * *